US006447918B1

(12) United States Patent
Gervasi et al.

(10) Patent No.: US 6,447,918 B1
(45) Date of Patent: Sep. 10, 2002

(54) INTERPENETRATING POLYMER NETWORK OF POLYTETRA FLUOROETHYLENE AND SILICONE ELASTOMER FOR USE IN ELECTROPHOTOGRAPHIC FUSING APPLICATIONS

(75) Inventors: David J. Gervasi, West Henrietta; George A. Riehle, Webster; George J. Heeks, Rochester; Arnold W. Henry; Santokh S. Badesha, both of Pittsford, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/772,620

(22) Filed: Jan. 30, 2001

(51) Int. Cl.[7] .......................... B32B 27/00; G03G 13/20

(52) U.S. Cl. ....................... 428/421; 428/447; 430/124; 399/333; 264/204

(58) Field of Search ......................... 430/124; 399/333; 428/421, 447; 264/204

(56) References Cited

U.S. PATENT DOCUMENTS

| | | | | |
|---|---|---|---|---|
| 3,315,020 | A | 4/1967 | Gore | 264/120 |
| 3,888,815 | A | 6/1975 | Bessmer et al. | 260/37 SB |
| 3,998,502 | A | 12/1976 | Walter et al. | 308/9 |
| 4,032,699 | A | 6/1977 | West, III | 526/18 |
| 4,250,074 | A | 2/1981 | Foscante et al. | 260/32.8 EP |
| 4,257,699 | A | 3/1981 | Lentz | 355/3 |
| 4,264,101 | A | 4/1981 | Gotoh | 296/194 |
| 4,264,181 | A | 4/1981 | Lentz et al. | 355/3 FU |
| 4,272,179 | A | 6/1981 | Seanor | 355/3 FU |
| 4,777,087 | A | 10/1988 | Heeks et al. | 428/321 |
| 4,945,125 | A | 7/1990 | Dillon et al. | 527/427 |
| 5,141,788 | A | 8/1992 | Badesha et al. | 428/36.8 |
| 5,166,031 | A | 11/1992 | Badesha et al. | 430/124 |
| 5,695,878 | A | 12/1997 | Badesha et al. | 428/334 |
| 5,700,568 | A | 12/1997 | Badesha et al. | 428/334 |
| 5,729,813 | A | 3/1998 | Eddy et al. | 399/333 |
| 5,954,910 | A | 9/1999 | Kikukawa et al. | 156/307.1 |
| 6,035,780 | A | 3/2000 | Badesha et al. | 101/217 |

FOREIGN PATENT DOCUMENTS

| | | |
|---|---|---|
| EP | 0 492 402 A1 | 7/1992 |
| EP | 0 625 735 A1 | 11/1994 |
| GB | 2 284 813 A | 6/1995 |
| WO | WO 87/02996 | 5/1987 |

*Primary Examiner*—Mark Chapman
(74) *Attorney, Agent, or Firm*—Perman & Green, LLP

(57) ABSTRACT

The present invention relates to electrostatographic fuser system members such as fuser rolls or belts having an outer surface layer comprising an interpenetrating polymer network comprising polytetrafluoroethylene and a cured polysiloxane elastomer, and a method for making such fuser system members.

4 Claims, No Drawings

INTERPENETRATING POLYMER NETWORK OF POLYTETRA FLUOROETHYLENE AND SILICONE ELASTOMER FOR USE IN ELECTROPHOTOGRAPHIC FUSING APPLICATIONS

BACKGROUND OF THE INVENTION

1. Field of the Invention

The invention relates to an interpenetrating polymer network for use as release layer coatings for fuser and transport belts used in electrostatographic printing apparati.

2. Description of Related Art

In a typical electrostatographic reproducing apparatus, a light image of an original to be copied is recorded in the form of an electrostatic latent image upon a photosensitive member and the latent image is subsequently rendered visible by the application of electroscopic thermoplastic resin and pigment particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner causes the toner to be firmly bonded to the support.

Typically, the thermoplastic resin particles are fused to the substrate by heating to a temperature of between about 90° C. to about 200° C. or higher depending upon the softening range of the particular resin used in the toner. It is undesirable, however, to increase the temperature of the substrate substantially higher than about 250° C. because of the tendency of the substrate to discolor at such elevated temperatures, particularly when the substrate is paper.

Several approaches to thermal fusing of electroscopic toner images have been described. These methods include providing the application of heat and pressure substantially concurrently by various means, such as a roll pair maintained in pressure contact, a belt member in pressure contact with a roll, and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair or plate or belt members. The concurrent transfer of heat and the application of pressure in the nip affects the fusing of the toner image onto the support. It is important in the fusing process that no offset of the toner particles from the support to the fuser member take place during normal operations. Toner particles that offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

One of the earliest and most successful fusing systems involved the use of silicone elastomer fusing surfaces, such as a roll with a silicone oil release agent which could be delivered to the fuser roll by a silicone elastomer donor roll. The silicone elastomers and silicone oil release agents used in such systems are described in numerous patents and fairly collectively illustrated in U.S. Pat. No. 4,777,087 to Heeks et al. While highly successful in providing a fusing surface with a very low surface energy to provide excellent release properties to ensure that the toner is completely released from the fuser roll during the fusing operation, these systems suffer from a significant deterioration in physical properties over time in a fusing environment. In particular, the silicone oil release agent tends to penetrate the surface of the silicone elastomer fuser members resulting in swelling of the body of the elastomer causing major mechanical failure including debonding of the elastomer from the substrate, softening and reduced toughness of the elastomer causing it to chunk out and crumble, contaminating the machine and providing non-uniform delivery of release agent. Furthermore, as described in U.S. Pat. No. 4,777,087, additional deterioration of physical properties of silicone elastomers results from the oxidative crosslinking, particularly of a fuser roll at elevated temperatures.

A more recent development in fusing systems involves the use of fluoroelastomer as fuser members which have a surface with a metal containing filler, which interact with polymeric release agents having functional groups, which interact with the metal containing filler in the fluoroelastomer surface. Such fusing systems, fusing members and release agents, are described in U.S. Pat No. 4,264,181 to Lentz et al. U.S. Pat. No. 4,257,699 to Lentz and U.S. Pat. No. 4,272,179 to Seanor. Typically, the fluoroelastomers used are (1) copolymers of vinylidenefluoride, hexafluoropropylene, and (2) terpolymer or vinylidenefluororide, hexafluoropropylene and tetrafluoroethylene. Commercially available materials include: Viton™ E430, Viton GF and other Viton designations as trademarks of E.I. Dupont deNemours, Inc. as well as the Fluoro™ materials of 3M Company. The preferred curing system for these materials is a nucleophilic system with a bisphenol crosslinking agent to generate a covalently crosslinked network polymer formed by the application of heat following base dehydrofluorination of the copolymer. Exemplary of such fuser member is an aluminum base member with a poly(vinyldenefluoride-hexafluoropropylene) copolymer cured with a bisphenol curing agent having lead oxide filler dispersed therein and utilizing a mercapto functional polyorganosiloxane oil as a release agent. In those fusing processes, the polymeric release agents have functional groups (also designated as chemically reactive functional groups) which interact with the metal containing filler dispersed in the elastomer or resinous material of the fuser member surface to form a thermally stable film which releases thermoplastic resin toner and which prevents the thermoplastic resin toner from contacting the elastomer material itself. The metal oxide, metal salt, metal alloy or other suitable metal compound filler dispersed in the elastomer or resin upon the fuser member surface interacts with the functional groups of the polymeric release agent. Preferably, the metal containing filler materials do not cause degradation or have any adverse effect upon the polymer release agent having functional groups. Because of this reaction between the elastomer having a metal containing filler and the polymeric release agent having functional groups, excellent release and the production of high quality copies are obtained even at high rates of speed of electrostatographic reproducing machines. While these fluoroelastomers have excellent mechanical and physical properties in that they have a long wearing life thereby maintaining toughness and strength over time in a fusing environment, they have to be used with expensive functional release agents and must contain expensive interactive metal-containing fillers.

More recently, advances have been made in attempts to incorporate the property benefits of both the fluoroelastomers and the silicone elastomers into fusing system surfaces. For example, U.S. Pat. No. 6,035,780 discloses compatibilized blends of fluoroelastomer and polysiloxane elastomer which can be fabricated into films and surfaces having good release and low surface energy properties.

U.S. Pat. No. 5,141,788 to Badesha et al. describes a fuser member comprising a supporting substrate having an outer layer of a cured fluoroelastomer having a thin surface layer of a polyorganosiloxane having been grafted to the surface of the cured fluoroelastomer in the presence of a dehydrofluorinating agent for the fluoroelastomer and having the active functionality from a hydrogen, hydroxy, alkoxy, amino, epoxy, vinyl acrylic, or mercapto group.

U.S. Pat. No. 5,166,031 to Badesha et al. is directed to a fuser member comprising a supporting substrate having an outer layer of a volume grafted elastomer which is a substantially uniform integral interpenetrating network of a hybrid composition of a fluoroelastomer and a polyorganosiloxane which is formed by dehydrofluorination of the fluoroelastomer by a nucleophilic dehydrofluorinating agent followed by addition polymerization by the addition of an alkene or alkyne functionally terminated polyorganosiloxane and a polymerization initiator.

Polytetrafluoroethylene is a well known material which has superior low surface energy and release properties and is used primarily as a coating for cooking surfaces, such as frypans, baking pans and the like. However, this material is not elastomeric in nature and is in fact a relatively brittle, difficult-to-process and solvent insoluble thermoplastic which renders it unsuitable per se for use in fabricating fuser release surfaces.

SUMMARY OF THE INVENTION

The present invention provides a fuser system member comprising a supporting substrate and an outer surface layer, said outer surface layer comprising an interpenetrating polymer network comprising polytetrafluoroethylene (PTFE) and a cured polysiloxane elastomer.

The invention also provides a process for manufacturing a fuser system member comprising (a) forming an intimate blend of a major amount of an unsintered and unfibrillated particulate polytetrafluoroethylene dispersion resin, a hydrocarbon liquid, a curable polysiloxane and a curing system for said polysiloxane; (b) forming said blend into an extrudable shape; (c) biaxially extruding said blend through a die into a shaped product having a randomly fibrillated structure; (d) evaporating said hydrocarbon liquid; (e) subjecting said shaped product to curing conditions to cure said polysiloxane; and (f) applying said shaped product to a supporting substrate to form a fuser member having an outer surface comprising said shaped product.

The fuser system surfaces prepared in accordance with the invention combine the fusing advantages of fluoropolymer and silicone elastomer fusing surfaces. The fusing surfaces possess the conformability and release characteristics that are required of fusing substrates while simultaneously possessing the strength and durability of the PTFE. The silicone component of the formulation contributes to the conformance and flex of the material while the PTFE provides film strength and non-swell characteristics. The composite IPN surface also provides a more limited swell in common fusing fluids, which is an advantage over materials composed of silicone only.

DETAILED DESCRIPTION OF THE INVENTION

The polysiloxane component which may be used as a component of the IPN composition of this invention is one or a mixture of curable polysiloxanes selected from dialkylsiloxanes wherein the alkyl groups are independently selected and contain from 1 to about 20 carbon atoms, alkylarylsiloxanes wherein the alkyl groups contain from 1 to about 20 carbon atoms and the aryl group contains from 6 to about 20 carbon atoms, diarylsiloxanes wherein the aryl groups are independently selected and contain from 6 to about 20 carbon atoms, substituted alkyl groups such as chloropropyl, trifluoropropyl, mecaptopropyl, carboxypropyl, aminopropyl and cyanopropyl, substituted alkenyl groups such as vinyl, propenyl, chlorovinyl and bromopropenyl and mixtures thereof. Examples of commercially available copolymeric silxane materials include Dow Corning Silastic™ 590 series, 9280 series, 9390 series, 3100 series, MOX4 series, Q-7 series, Sylgard™ series, 730 series, GP series, NPC series, LCS series, LT series and TR series; General Electric SE series, including SE-33, FSE, 2300, 2500, 2600 and 2700 and Wacker silicones Elastosil™ LR, Electroguard™ series, c-series, SWS series, S-series, T-series and V-series.

Preferred polysiloxanes are those containing free radical reactive functional groups containing at least one unsaturated carbon to carbon double bond groups such as vinyl or alkenyl groups.

Crosslinking agents include any of the known free radical initiator compounds such as peroxides, for example, hydrogen peroxide, alkyl or aryl peroxide and the like; persulfates, azo compounds, for example AIBN, and like compounds as well as mixtures thereof, which initiator compounds are present in amounts of from about 0.1 to about 10 wt % of the curable polysiloxane.

Alternatively, the polysiloxane may be a condensation curable polysiloxane based on a polydiorganosiloxane having terminal hydrolyzable groups, e.g., hydroxy or alkoxy and a catalyst which promotes condensation curing, such as the materials disclosed in U.S. Pat. No. 3,888,815, the complete disclosure of which patent is incorporated herein by reference.

In another embodiment, the polysiloxane may be a hydrolylically condensable silane having the formula Y—Si—

$(OX)_3$ where each X is independently selected from the group consisting of hydrogen, alkyl radicals, hydroxyalkyl radicals, and hydroxyalkoxyalkyl radicals, and Y is an alkyl radical, OX where X is as previously defined, or an amino or substituted amino radical. These materials used to form an IPN network are more completely disclosed in U.S. Pat. No. 4,250,074, the complete disclosure of which is incorporated herein by reference.

Curable blends of two polysiloxanes such as a polysiloxane containing free radical reactive functional groups and a second polysiloxane may also be used, such as disclosed in U.S. Pat. No. 6,035,780, the complete disclosure of which is incorporated herein by reference.

The polytetrafluoroethylene (PTFE) component of the composition may comprise unsintered and unfibrillated resin in the form of dispersion such as available from Dupont under the trade designation TEFLON® 6 and 6C and from Imperial Chemical industries under the names FLUON® CD1, CD123 or CD-525.

Preferably, the composition contains the PTFE as the major polymeric component, i.e., it contains at least 50 wt % of PTFE based on the polymer content. Preferably the polysiloxane constitutes from about 1 to 30 wt % of the polymer content of the composition.

The composition may also contain from about 15 to 20 volume percent of one or more filler materials which impart additional desired physical properties to the fuser surface, such as thermal conductivity, increased durometer harness and electrical conductivity. Suitable fillers include carbon black, antimony oxide, antimony doped tin oxide, iron oxide, aluminum oxide, silica and like materials.

The substrate for the fuser member of the fuser system assembly may be a roll, belt, flat surface or other suitable shapes used in the fixing of thermoplastic toner images to a suitable substrate. The substrate may take the form of a fuser member, as pressure member or a release agent donor member, and may be composed of metal or a flexible belt material derived from a thermoplastic, thermoset or elastomeric resin such as polyamide or polyimide resins and cured polysiloxane or diolefin elastomers. A film of the IPN composition may be laminated to or wrapped around the substrate using suitable adhesives which will form a firm bond between the IPN film and the metal or resinous substrate. Suitable adhesives include silicone elastomers, fluoroelastomers, epoxy resins, acrylic resins and the like. Alternatively, where the substrate is in the form of a roll, the IPN composition may be extruded or molded into the shape of a cylindrical collar which is adapted to fit snugly around the cylindrical base, with or without the use of an intermediate adhesive.

The thickness of the IPN outer surface of film of the fuser member may range from about —5— to —60— micrometer, more preferably from about —15— to —25— micrometers.

The outer surface of the fuser member is prepared by first forming an intimate mixture of a PTFE polymer dispersion and a minor amount of the curable polysiloxane polymer. Preferably minor amounts of a suitable organic liquid such as a $C_4$–$C_{20}$ alkane or kerosene are included in the mixture to facilitate blending and act as a lubricant. A crosslinking agent and crosslinking catalyst is also added to the mixtures.

In the second step of the process of this invention, the blend is compacted into a preform shape adapted to the configuration necessary for the process of biaxial fibrillation as described in U.S. Pat. No. 3,315,020.

Is the third step of the process of this invention, paste extrusion of the preformed blend is carried out in the known manner of biaxial fibrillation as described in U.S. Pat. No. 3,315,020.

In the fourth step of the process of this invention, the hydrocarbon liquid contained in the blend is evaporated, and simultaneously therewith or later the catalyst for the siloxane crosslinking reaction is activated thereby generating a cured silicone elastomer and polytetrafluoroethylene semi-interpenetrating polymer network in the form of the biaxially fibrillated extrudate.

Where films are prepared, the resulting extrudate is preferably calendared by known methods to produce a film having a thickness in the range of about —50— to about —125— micrometers.

Films of molded cylindrical shapes may then be applied to and adhered to supporting substrates to form the fuser system members of the present invention. The curing step described above may be carried out after application of the outer surface release layer to the substrate.

Films and other shapes made in accordance with this invention may be generally prepared by the process disclosed in U.S. Pat. No. 4,945,125, the complete disclosure of which patent is incorporated herein by reference.

What is claimed is:

1. A fuser system member comprising a supporting substrate and an outer surface layer, said outer surface layer comprising an interpenetrating polymer network comprising polytetrafluoroethylene and a cured polysiloxane elastomer.

2. A process for manufacturing a fuser system member comprising:

a) forming an intimate blend of a major amount of an unsintered and unfibrillated particulate polytetrafluoroethylene resin dispersion, a hydrocarbon liquid, a curable polysiloxane and a curing system for said polysiloxane;

b) forming said blend into an extrudable shape;

c) biaxially extruding said blend through a die into a shaped product having a randomly fibrillated structure;

d) evaporating said hydrocarbon liquid;

e) subjecting said shaped product to curing conditions to cure said polysiloxane; and f) applying said shaped product to a supporting substrate to form a fuser member having an outer surface comprising said shaped product.

3. The process of claim 2 wherein said step (f) is conducted prior to step (e).

4. The process of claim 2 wherein said shaped product comprises a film.

* * * * *